United States Patent
Ottley et al.

(10) Patent No.: US 12,247,847 B2
(45) Date of Patent: Mar. 11, 2025

(54) ELECTRODE AND SHIELDING SYSTEMS AND METHODS FOR COMPLIANT SENSORS

(71) Applicant: Bend Labs, Inc., Salt Lake City, UT (US)

(72) Inventors: Colton A Ottley, Farmington, UT (US); Jared K. Jonas, Seattle, WA (US); Colin D. Eichinger, Salt Lake City, UT (US); Nathan Grimes, Bountiful, UT (US); Nathan C. Briggs, Ogden, UT (US)

(73) Assignee: Bend Labs, Inc., Salt Lake City, UT (US)

( * ) Notice: Subject to any disclaimer, the term of this patent is extended or adjusted under 35 U.S.C. 154(b) by 366 days.

(21) Appl. No.: 17/387,709

(22) Filed: Jul. 28, 2021

(65) Prior Publication Data
US 2022/0034692 A1 Feb. 3, 2022

Related U.S. Application Data

(60) Provisional application No. 63/058,098, filed on Jul. 29, 2020.

(51) Int. Cl.
*G01D 11/24* (2006.01)
*G01D 5/241* (2006.01)

(52) U.S. Cl.
CPC ......... *G01D 11/245* (2013.01); *G01D 5/2417* (2013.01)

(58) Field of Classification Search
CPC .......................... G01D 11/245; G01D 5/2417
See application file for complete search history.

(56) References Cited

U.S. PATENT DOCUMENTS

| 10,588,539 B1 | 3/2020 | Kosierkiewicz |
| 2009/0015270 A1 | 1/2009 | Hayakawa et al. |
| 2014/0305226 A1 | 10/2014 | Eichhorn et al. |

(Continued)

FOREIGN PATENT DOCUMENTS

EP 0286747 A1 10/1988

OTHER PUBLICATIONS

International Searching Authority; International Search Report and Written Opinion for Applicaiton No. PCT/US21/43622 dated Dec. 21, 2021.

*Primary Examiner* — Minh Q Phan
(74) *Attorney, Agent, or Firm* — Christopher J. Cuneo; Parsons Behle & Latimer

(57) ABSTRACT

Disclosed embodiments include compliant sensors having a signal electrode layer of an elastomeric material with conducting material confined to at least one sensor region, at least one trace connected to the at least one sensor, and a perimeter electrode region. The compliant sensors also include a dielectric layer including an elastomeric material having a first side in contact with the signal electrode layer and configured to allow electrical contact to the perimeter electrode region and a top electrode layer including an elastomeric material with conducting material integrated within and in contact with a second side of the dielectric layer and in electrical contact with the perimeter electrode region. In some embodiments, the top electrode layer includes a portion of electrically conducting material configured in a hatched pattern.

14 Claims, 7 Drawing Sheets

(56) References Cited

U.S. PATENT DOCUMENTS

| | | | |
|---|---|---|---|
| 2017/0357357 A1* | 12/2017 | Hinson | G06F 3/0447 |
| 2018/0253169 A1* | 9/2018 | Carley | G06F 3/04164 |
| 2020/0120787 A1* | 4/2020 | Feng | H05K 1/025 |
| 2020/0183494 A1 | 6/2020 | Reese et al. | |

* cited by examiner

ELECTRODE AND SHIELDING SYSTEMS AND METHODS FOR COMPLIANT SENSORS

CROSS-REFERENCE TO RELATED APPLICATIONS

This application, under 35 U.S.C. § 119, claims the benefit of U.S. Provisional Patent Application Ser. No. 63/058,098 filed on Jul. 29, 2020, and entitled "ELECTRODE AND SHIELDING SYSTEMS AND METHODS FOR COMPLIANT SENSORS," the contents of which are hereby incorporated by reference herein.

This application is also related to the following U.S. Pat. Nos.: 8,941,392; 9,222,764; 9,476,692; 9,612,102; 9,874,431; 10,823,546; and 10,959,644, the contents of which are hereby incorporated by reference herein.

FIELD OF THE DISCLOSURE

This disclosure relates to force, strain, flex, bend, or the like, sensor systems and methods. More particularly, this disclosure relates to systems and methods for shielding sensors, attaching electronics to a substrate, and improving signal response in flexible, extensible, compliant, or the like, capacitive sensor systems and methods.

BACKGROUND

There is often a need for a flexible, extensible, compliant, force, strain, bend, or the like, sensor. For example, a medical device sensor system may use a compliant force sensor as part of a limb brace, or the like. Likewise, structural monitoring systems, such as bridge or building monitors, may use a compliant force sensor to detect structural movement, or the like. However, with existing systems and methods it is often difficult or inconvenient to attach a flexible, elastomer-containing sensor array to a printed circuit board (PCB) containing the operational electronics.

Additionally, flexible sensor systems often include distributed sensing regions that include electrical connections (e.g., traces) of varying lengths. The variation in length can cause a related variance in base capacitance levels of the sensing regions that can be problematic and otherwise inconvenient to compensate for in the electronic circuitry.

Furthermore, flexible, extensible, or compliant sensor systems with distributed sensing regions may also experience mechanical crosstalk in regions where traces flex and/or strain induce errant capacitance signals. The crosstalk from the traces can be significant in regions with relatively large surface area coupled to a ground electrode.

Other drawbacks, inconveniences, inefficiencies, and issues also exist with current systems and methods.

SUMMARY

Disclosed systems, methods, and articles of manufacture address the above, and other, drawbacks, inconveniences, inefficiencies, and issues with current systems and methods. Other advantages and efficiencies of disclosed systems and methods also exist.

As used herein, "flexible," "extensible," "compliant," and the like are used somewhat interchangeably and all mean that there is some amount of flexing, stretching, twisting, bending, or the like, of the described embodiment.

Disclosed exemplary embodiments include a compliant sensor having a signal electrode layer that is an elastomeric material with conducting material confined to at least one sensor region, at least one trace connected to the at least one sensor, and a perimeter electrode region. The compliant sensor includes a dielectric layer that is an elastomeric material having a first side in contact with the signal electrode layer and configured to allow electrical contact to the perimeter electrode region, and a top electrode layer that is an elastomeric material with conducting material integrated within and in contact with a second side of the dielectric layer and in electrical contact with the perimeter electrode region.

In some embodiments, the top electrode layer further includes a Printed Circuit Board (PCB) interface comprising at least one conductive trace pad.

In some embodiments, the top electrode layer includes a portion of electrically conducting material configured in a hatched pattern.

In some embodiments, the conducting material includes conductive particulate material.

Another disclosed exemplary embodiment is a compliant three-electrode stack sensor having a first cover dielectric layer comprising an elastomeric material and configured to substantially cover a first side of a top electrode layer. The top electrode layer including an elastomeric material with conductive material integrated within. The three-electrode stack sensor further includes a second dielectric layer including an elastomeric material in contact with a second side of the top electrode layer and configured to allow electrical contact to a perimeter electrode region of a signal electrode layer. The signal electrode layer having a first side in contact with the second dielectric layer and including an elastomeric material with conducting material confined to at least one sensor region, at least one trace connected to the at least one sensor, and the perimeter electrode region.

The three-electrode stack sensor further includes a third dielectric layer in contact with a second side of the signal electrode layer and including an elastomeric material and configured to allow electrical contact to the perimeter electrode region of the signal electrode layer, a bottom electrode layer in contact with a second side of the third dielectric layer and including an elastomeric material with conductive material integrated within, and a second cover dielectric layer including an elastomeric material and configured to substantially cover a second side of the bottom electrode layer.

In some embodiments of the compliant three-electrode stack sensor, the top electrode layer includes a portion of electrically conducting material configured in a hatched pattern. In further embodiments, the bottom electrode layer includes a portion of electrically conducting material configured in a hatched pattern. In still further embodiments, the top electrode layer and the bottom electrode layer include a portion of electrically conducting material configured in a hatched pattern.

Also disclosed is a multi-region compliant angular displacement sensor system including a first compliant sensor, a second compliant sensor, and an elastomeric connector coupling the first compliant sensor to the second compliant sensor. The compliant sensors may include two-electrode stacks, three-electrode stacks, or combinations of the same. Other embodiments also exist.

Figure 1A:
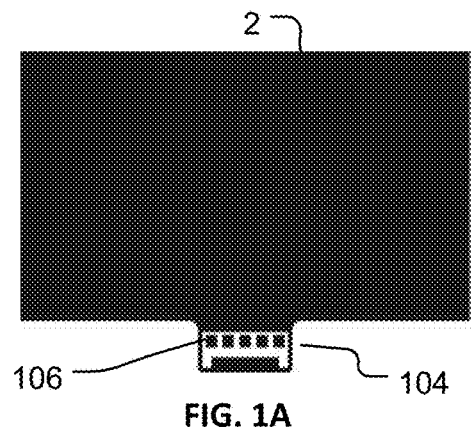
FIGS. 1A-D are schematic illustrations of a compliant system showing a simplified two-electrode stack in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

FIGS. 1A-D are schematic illustrations of a compliant sensor system showing a simplified two-electrode stack in accordance with disclosed embodiments. FIG. 1A illustrates a top electrode layer 2 that may comprise an elastomeric layer (e.g., silicone) with conductive particles (e.g., nano-particles, such as carbon black, nickel nano-strands, silver nano-particles, graphene nano-platelets, graphene-oxides, or the like) integrated within. While shown in FIG. 1A as a continuous layer, top electrode layer 2 may also be "hatched" as disclosed below with reference to FIGS. 3-6. Top electrode layer 2 may also include a PCB interface 104 and a number of conductive trace pads 106 for attaching a PCB, sensor traces, or other electronics, for operation and control of the sensor system.

Figure 1B:
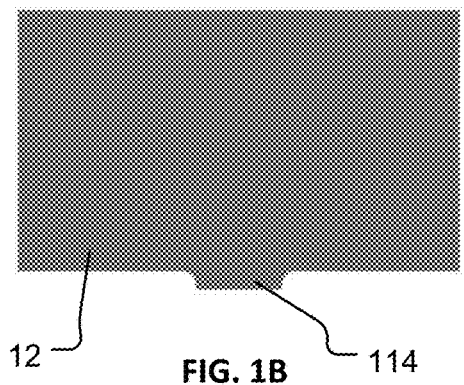

FIG. 1B shows a dielectric layer 12 that may comprise an elastomeric material (e.g., silicone) and, as desired, may have some conductive material integrated within depending upon, among other things, the intended amount of permittivity, or the like. While not drawn rigorously to scale, dielectric layer 12 is sized to be slightly smaller than top electrode layer 2 to leave a perimeter edge of top electrode layer 2 uncovered by dielectric layer 12 and allow electrical contact with perimeter electrode 140 as disclosed below. Embodiments of dielectric layer 12 may also include a tab portion 114 sized to cover PCB interface 104 up to the trace pads 106.

Figure 1C:
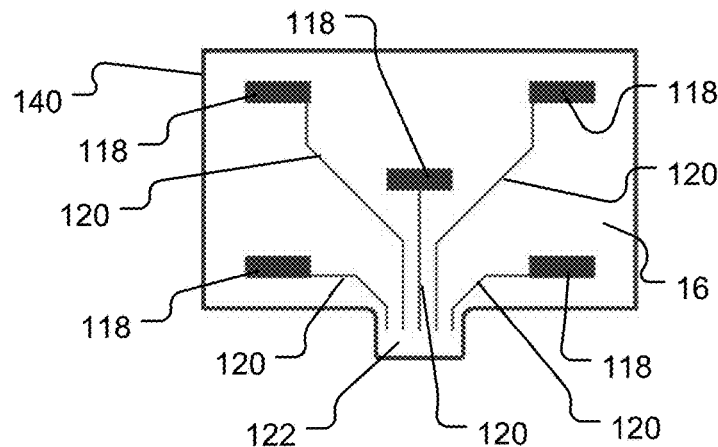

FIG. 1C shows a signal electrode layer 16 which may comprise an elastomeric material (e.g., silicone) with conductive material (e.g., nano-particles, such as carbon black, nickel nano-strands, silver nano-particles, graphene nano-platelets, graphene-oxides, or the like) confined to the sensor regions 118, traces 120, and perimeter electrode 140. As shown, a number of sensor regions 118 may be distributed throughout the layer 116. Sensor regions 118 may comprise regions of electrically conductive material. Sensor regions 118 are electrically in communication with traces 120 that are printed with signal electrode layer 16. Traces 120 terminate at a tab region 122 that aligns with trace pads 106 to provide electrical connection points for traces 120. As shown, embodiments of signal electrode layer 16 may include a perimeter electrode 140 that electrically connects to top electrode layer 2 to, among other things, provide electrical isolation for the entire sensor system.

Figure 1D:
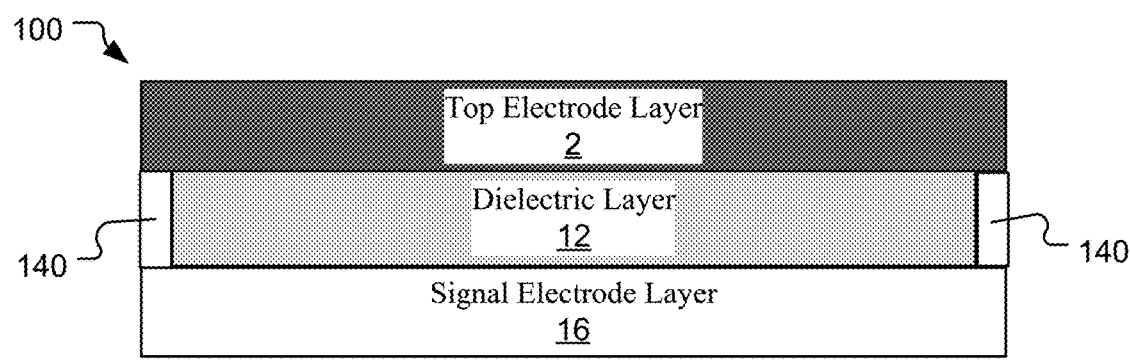

FIG. 1D is a schematic cross-sectional view of a stack 100 of the above-disclosed layers to form a compliant sensor system. As shown, top electrode layer 2, is in between dielectric layer 12 and signal electrode layer 16. As also indicated schematically, perimeter electrode 140 electrically connects top electrode layer 2 and signal electrode layer 16. Other configurations are also possible.

Figure 2A:
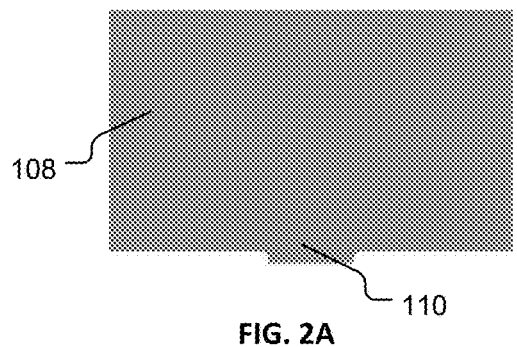
FIGS. 2A-G are illustrations of electrode and shielding systems for a flexible sensor system in accordance with disclosed embodiments.

FIGS. 2A-G are illustrations of electrode and shielding systems for a flexible three-electrode stack sensor system in accordance with disclosed embodiments. As shown in FIG. 2A, a first cover dielectric layer 108 may optionally be provided in some embodiments. First cover dielectric layer 108 may comprise an elastomeric material such as silicone, or the like. First cover dielectric layer 108 may be used to cover top electrode layer 102 (disclosed below with FIG. 2B) to prevent the top electrode layer 102 from unwanted contact with other objects, surfaces, or the like. While not drawn rigorously to scale, first cover dielectric layer 108 is sized to cover top electrode layer 102 and may be larger than top electrode layer 102 in some embodiments. As also indicated, first cover dielectric layer 108 includes a tab portion 110 for covering top electrode layer 102 up to conductive trace pads 106.

Figure 2B:
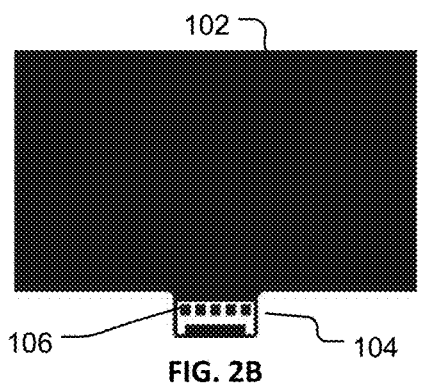

FIG. 2B shows a top electrode layer 102 that may be provided. Top electrode layer 102 can comprise an elastomeric layer (e.g., silicone) with conductive particles (e.g., nano-particles, such as carbon black, nickel nano-strands, graphene nano-platelets, graphene-oxides, or the like) integrated within. Top electrode layer 102 may also include a PCB interface 104 and a number of conductive trace pads 106 for attaching a PCB, sensor traces, or other electronics, for operation and control of the sensor system.

Figure 2C:
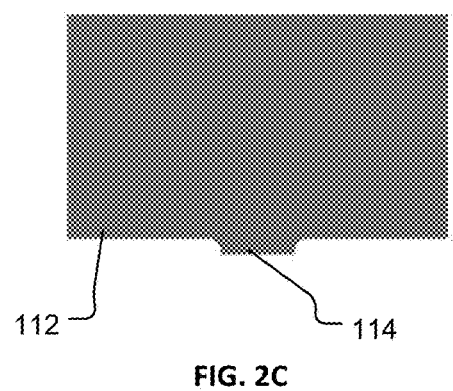

FIG. 2C shows a second dielectric, layer 112. Second dielectric layer 112 may comprise an elastomeric material (e.g., silicone) and, as desired, may have some conductive material integrated within depending upon, among other things, the intended amount of permittivity, or the like. While not drawn rigorously to scale, second dielectric layer 112 is sized to be slightly smaller than top electrode layer 102 to leave a perimeter edge of top electrode layer 102 uncovered by dielectric layer 112 and allow electrical contact with perimeter electrode 140 as disclosed herein. Embodiments of second dielectric layer 112 may also include a tab portion 114 sized to cover PCB interface 104 up to the trace pads 106.

Figure 2D:
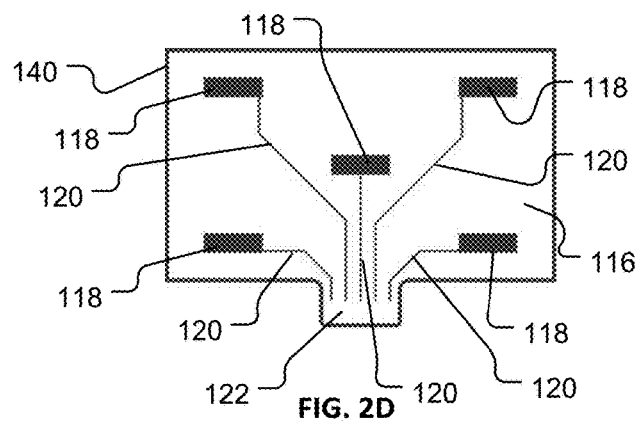

FIG. 2D shows a signal electrode layer 116. Embodiments of signal electrode layer 116 may comprise an elastomeric material (e.g., silicone) with conductive material (e.g., nanoparticles, such as carbon black, nickel nano-strands, silver nano-particles, graphene nano-platelets, graphene-oxides, or the like) confined to the sensor regions 118, traces 120, and perimeter electrode 140. As shown, a number of sensor regions 118 may be distributed throughout the layer 116. Sensor regions 118 may comprise regions of electrically conductive material. Sensor regions 118 are electrically in communication with traces 120 that are printed with signal electrode layer 116. Traces 120 terminate at a tab region 122 that aligns with trace pads 106 to provide electrical connection points for traces 120. As shown, embodiments of signal electrode layer 116 may include a perimeter electrode 140 that electrically connects to top electrode layer 102 and bottom electrode layer 132 to, among other things, provide electrical isolation for the entire sensor system.

Figure 2E:
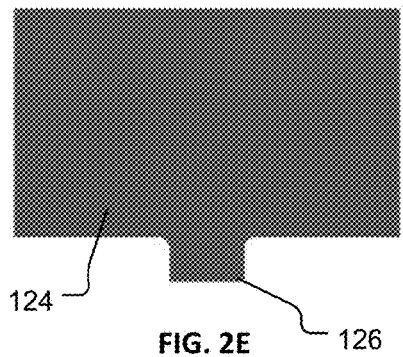

FIG. 2E shows a third dielectric, layer 124. Third dielectric layer 124 may comprise an elastomeric material (e.g., silicone) and, as desired, may have some conductive material integrated within depending upon, among other things, the intended amount of permittivity, or the like. While not drawn rigorously to scale, third dielectric layer 124 is sized to be slightly smaller than bottom electrode layer 132 to leave a perimeter edge of bottom electrode layer 132 uncovered by third dielectric layer 124 and allow electrical contact with perimeter electrode 140 as disclosed herein. Embodiments of third dielectric layer 124 may also include a tab portion 126 sized to cover PCB interface 104 up to the trace pads 106.

Figure 2F:
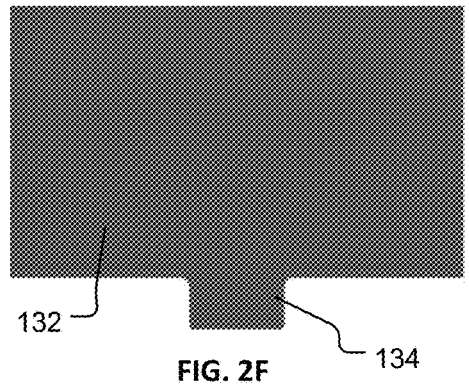

FIG. 2F shows a bottom electrode layer 132 that may be provided. Bottom electrode layer 132 can comprise an elastomeric layer (e.g., silicone) with conductive particles (e.g., nano-particles, such as carbon black, nickel nano-strands, graphene nano-platelets, graphene-oxides, or the like) integrated within. As also indicated, bottom electrode layer 132 includes a tab portion 134 for, among other things, providing mechanical strength for the connective region (e.g., PCB interface 104) for the trace pads 106 to be printed onto, as opposed to tab portions 110, 114 which are pulled back as to not cover the electrically conductive pads 106. Other configurations are also possible.

Figure 2G:
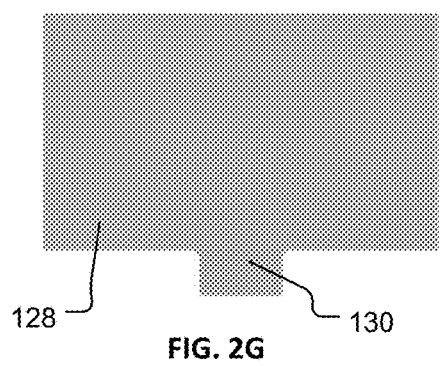

FIG. 2G shows a second cover dielectric layer 128 that may optionally be provided in some embodiments. Second cover dielectric layer 128 may comprise an elastomeric material such as silicone, or the like. Second cover dielectric layer 128 may be used to cover bottom electrode layer 132 (disclosed above with FIG. 2F) to prevent the bottom electrode layer 132 from unwanted contact with other objects, surfaces, or the like. While not drawn rigorously to scale, second cover dielectric layer 128 is sized to cover bottom electrode layer 132 and may be larger than bottom electrode layer 132 in some embodiments. As also indicated, second cover dielectric layer 128 includes a tab portion 130 for supporting the connective region (e.g., PCB interface 104) for the trace pads 106.

As persons of ordinary skill in the art having the benefit of this disclosure would understand, the three electrode stack shown in FIGS. 2A-G may be extended to more, or less, electrode layers. Likewise, more or less sensor regions 118 and traces 120 may be used in other configurations and shapes.

Figure 3:
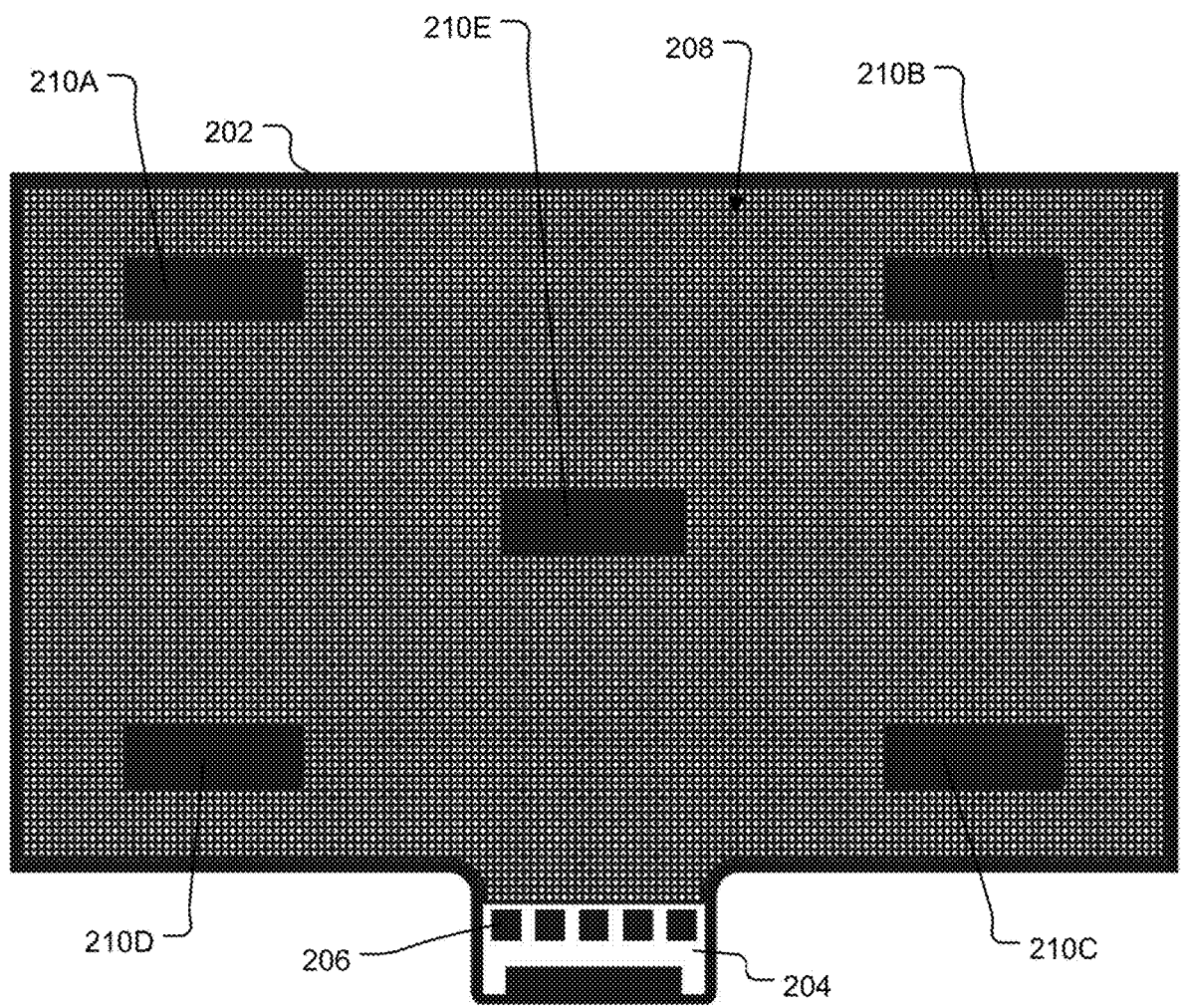
FIG. 3 is a schematic illustration for a top electrode layer 202 in accordance with disclosed embodiments.

FIG. 3 is a schematic illustration for a top electrode layer 202 in accordance with disclosed embodiments. As shown, top electrode layer 202 includes a partially open, checkered, or hatched portion 208 of an electrically conducting material such as carbon nanotubes, silver nanoparticles, other conductive particles, or the like, that is printed on a elastomeric substrate (e.g., silicone or the like). One advantage of the hatched portion 208 is that it provides similar electric shielding for a capacitive sensor with a reduced stray capacitance from the traces (e.g., 120) due to the reduced surface area of the traces coupling to the top (e.g., 102, 202) and bottom (e.g., 132, 432) electrodes. Such a configuration results in less error signal generated by strain and or flexion in the traces. The reduction of the error signal is proportional to the amount of surface area that is removed by the hatched portion 208. Embodiments of the hatched portion 208 may vary the open space amounts according to, among other things, the signal frequencies to be shielded, the width of the traces 120, and the like. In general, wider traces 120 produce more error signal (mechanical crosstalk) and for those embodiments a more aggressive hatching portion 208 (i.e., larger voids) will further reduce the crosstalk.

Figure 4:
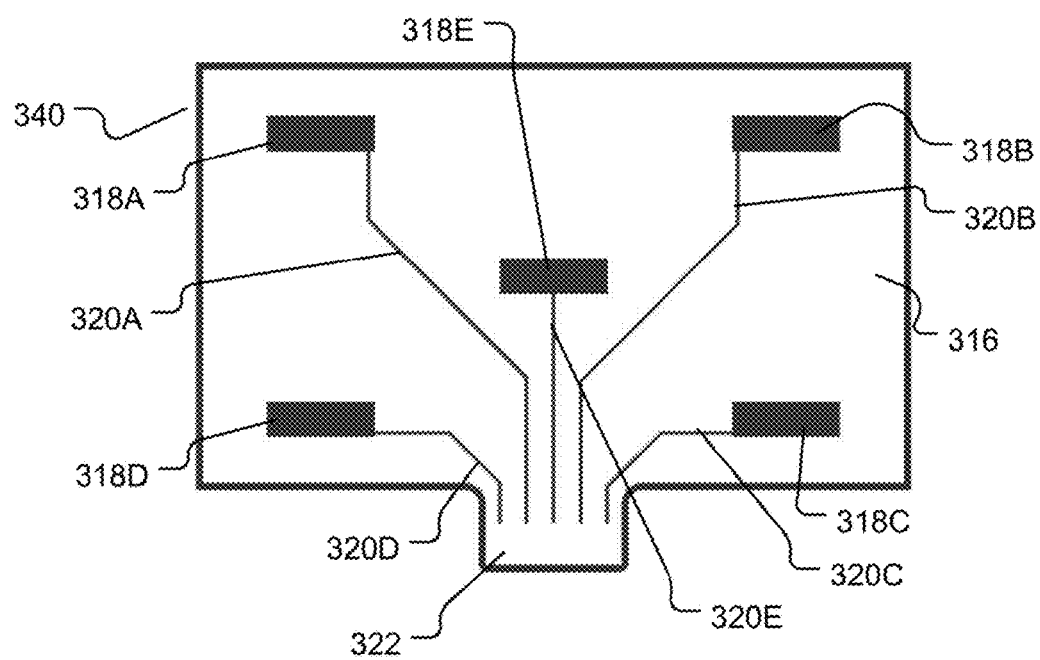
FIG. 4 is a schematic illustration of a signal electrode layer 316 in accordance with disclosed embodiments.

As also shown, top layer 202 may include a PCB interface 204 and a number of conductive trace pads 206 for attaching a PCB, sensor traces, or other electronics, for operation and control of the sensor system. Sensing regions 210A-210E are located in areas to align with sensing electrodes 318A-318E on an electrode layer 316 (e.g., as shown in FIG. 4). Of course, those of ordinary skill in the art having the benefit of this disclosure would understand that the shapes, sizes, connections, and locations of sensing regions 210A-210E are merely exemplary and can vary in accordance with, among other things, the particular application of the sensor system.

FIG. 4 is a schematic illustration of a signal electrode layer 316 in accordance with disclosed embodiments. As shown, a number of sensing electrodes 318A-318E that are printed with signal electrode layer 316 at the desired sizes, locations, and shapes. Sensing electrodes 318A-318E are electrically connected to conductor traces 320A-320E which may also vary in number, size, shape, location, and the like, as desired. Traces 320A-320E terminate at a tab portion 322 that aligns with trace pads 206 to provide electrical connection points for traces 320A-320E. As also shown, embodiments of signal electrode layer 316 may include a perimeter electrode 340 that electrically connects to top electrode layer 202 (and in some embodiments a bottom electrode layer (e.g., 132, 432)) to, among other things, provide electrical isolation for the entire sensor system.

Figure 5:
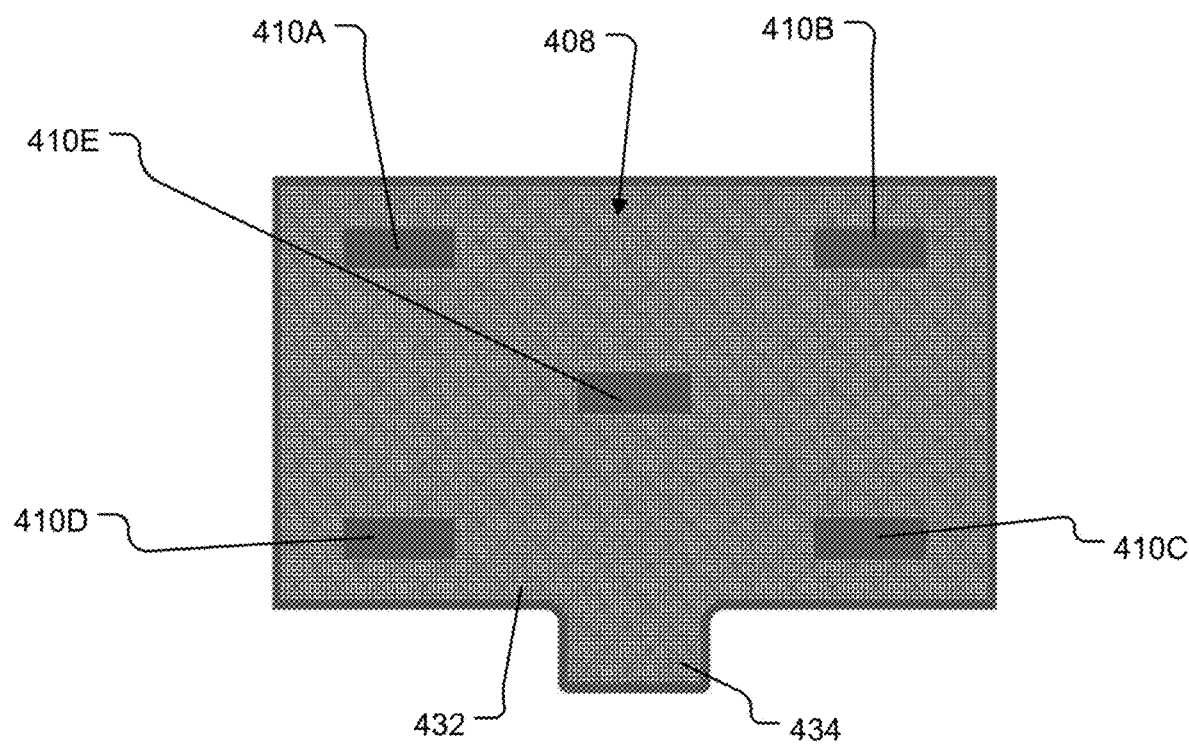
FIG. 5 is a schematic illustration of a bottom electrode layer 432 in accordance with disclosed embodiments.

FIG. 5 is a schematic illustration of a bottom electrode layer 432 in accordance with disclosed embodiments. As shown, bottom electrode layer 432 includes a partially open, checkered, or hatched portion 408 of an electrically conducting material such as carbon nanotubes, silver nanoparticles, other conductive particles, or the like, that is printed on a elastomeric substrate (e.g., silicone or the like). One advantage of the hatched portion 408 is that it provides similar electric shielding for a capacitive sensor with a reduced stray capacitance from the traces (e.g., 120) due to the reduced surface area of the traces coupling to the top (e.g., 102, 202) and bottom (e.g., 132, 432) electrodes. Such a configuration results in less error signal generated by strain and or flexion in the traces. The reduction of the error signal is proportional to the amount of surface area that is removed by the hatched portion 408. Embodiments of the hatched portion 408 may vary the open space amounts according to, among other things, the signal frequencies to be shielded, the width of the traces 120, and the like. In general, wider traces 120 produce more error signal (mechanical crosstalk) and for those embodiments a more aggressive hatching portion 408 (i.e., larger voids) will further reduce the crosstalk.

As also shown, bottom layer 432 may include a tab region 432 for supporting the connective region (e.g., PCB interface 204) for the trace pads 206. Sensing regions 410A-410E are located in areas to align with sensing electrodes 318A-318E on an electrode layer 316 (e.g., as shown in FIG. 3). Of course, those of ordinary skill in the art having the benefit of this disclosure would understand that the shapes, sizes, connections, and locations of sensing regions 410A-410E are merely exemplary and can vary in accordance with, among other things, the particular application of the sensor system.

Figure 6:
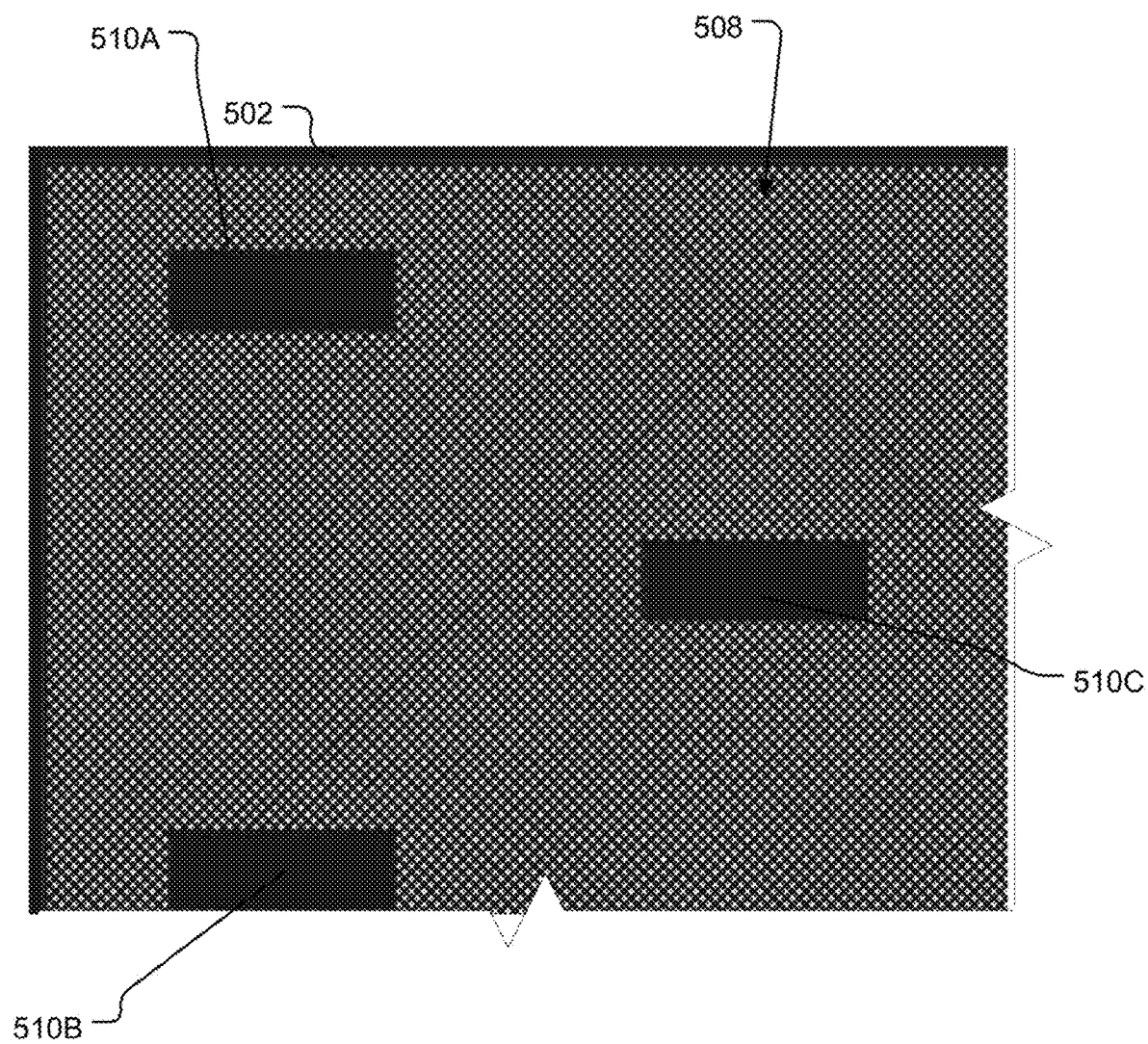
FIG. 6 is a schematic of a portion of a top electrode layer 502 in accordance with disclosed embodiments.

As shown in FIGS. 3 and 5, embodiments of the sensor system may include hatched portions 208, 408 where the direction of hatching is a "rectangular" grid that is substantially orthogonal (i.e., intersects in 90° angles) and substantially aligned (i.e., parallel) with the layer edges in each direction. Persons of ordinary skill having the benefit of this disclosure would understand that other alignments are also possible. For example, FIG. 6 is a schematic of a portion of a layer 502 in accordance with disclosed embodiments. As shown in FIG. 6, hatched portion 508 is aligned at substantially 45° with respect to layer 502 edges. One advantage of this hatched portion 508 is, depending upon orientation and width of the traces (e.g., 120) the amount of coupling may decrease with 45° or 90° hatching. Additionally, manufacturing tolerances may be better with a particular angle for the hatched portion 508. Layer 502 may be a top layer (e.g., like 202) or a bottom layer (e.g., like 432) and include sensing portions 510A-510C as desired. In some embodiments top layer (e.g., 202) and bottom layer (e.g., 432) may have differing hatched portions (e.g., 208, 408, 508). Other configurations are also possible.

Figure 7:
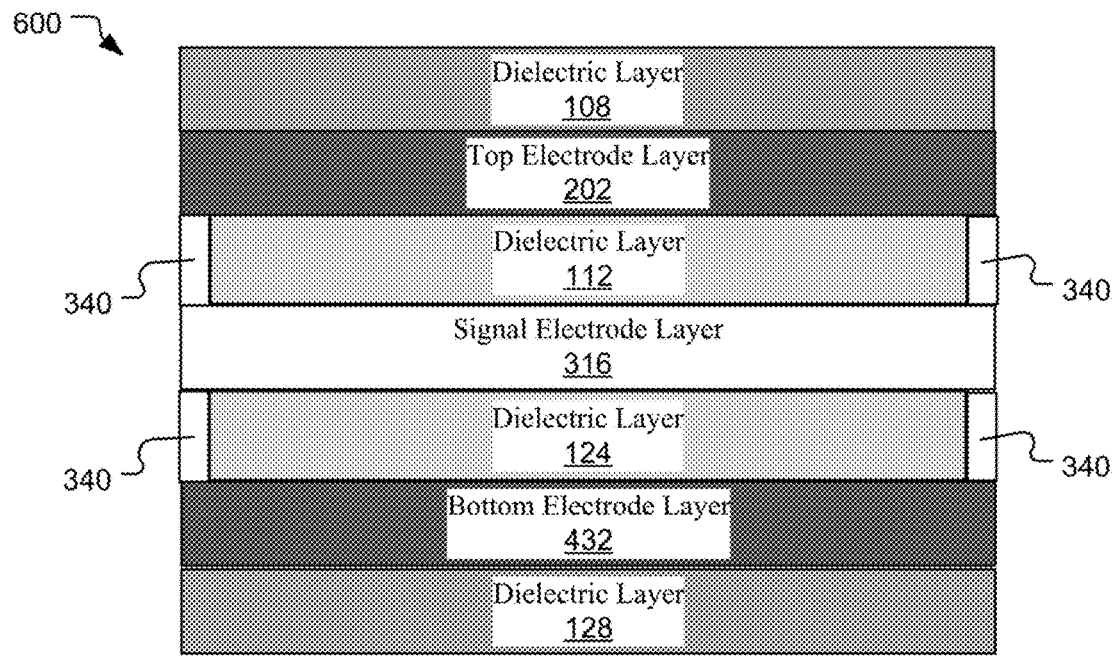
FIG. 7 is a cross-sectional schematic view of a sensor system 600 in accordance with disclosed embodiments.

FIG. 7 is a cross-sectional schematic view of a sensor system 600 in accordance with disclosed embodiments. As shown, embodiments of sensor system 600 may include the various top layers (e.g., 2, 202, 502), bottom layers (e.g., 132, 432), electrode layers (e.g., 16, 116, 316) and a number of dielectric layers (e.g., 108, 112, 124, 128). The actual layers used may depend, among other things, on the application, type of sensing desired, environment for the sensor, and the like. As persons of ordinary skill in the art having the benefit of this disclosure would understand, more, less, different, various thickness, various materials, and the like, layers may be used.

Figure 8:
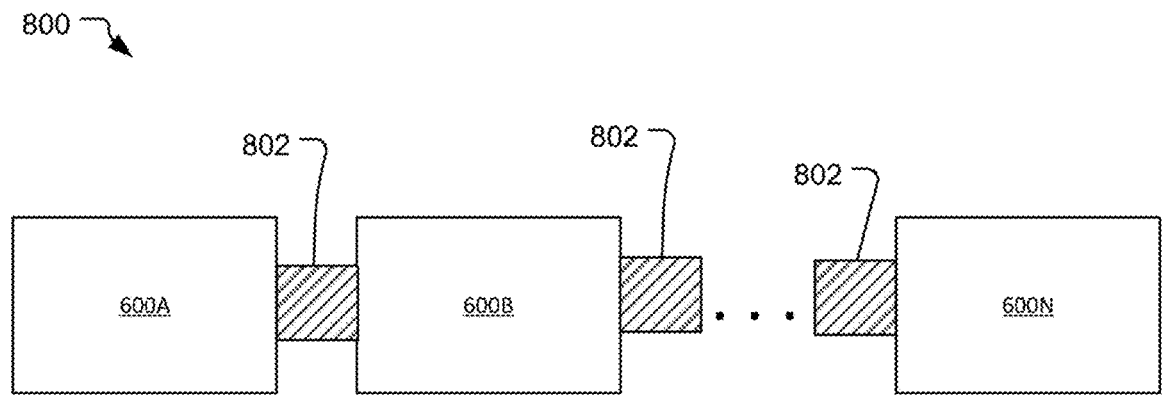
FIG. 8 is a multi-region angular displacement sensor in accordance with disclosed embodiments.

FIG. 8 is a multi-region angular displacement sensor 800 in accordance with disclosed embodiments. As shown, embodiments of the sensor system 600 as disclosed in FIG. 7, may be coupled together to form an angular displacement sensor 800. For example, by coupling sensor system 600A through an elastomeric connector 802 to a second sensor system 600B an angular displacement sensor 800 (single region, multi-region, or the like) may be implemented. Additional disclosure of the construction, operation, and implementation of such displacement sensor systems 800 may be found in U.S. Pat. No. 10,551,917, issued to the same assignee, Bend Labs, of Salt Lake City, UT, as the present disclosure, and the disclosure of which is hereby incorporated by reference in its entirety.

As persons of ordinary skill in the art having the benefit of this disclosure would understand, the angular displacement sensor 800 can be extended to as many regions as desired as indicated by additional elastomeric connectors 802 and sensor systems 600N.

Figure 9:
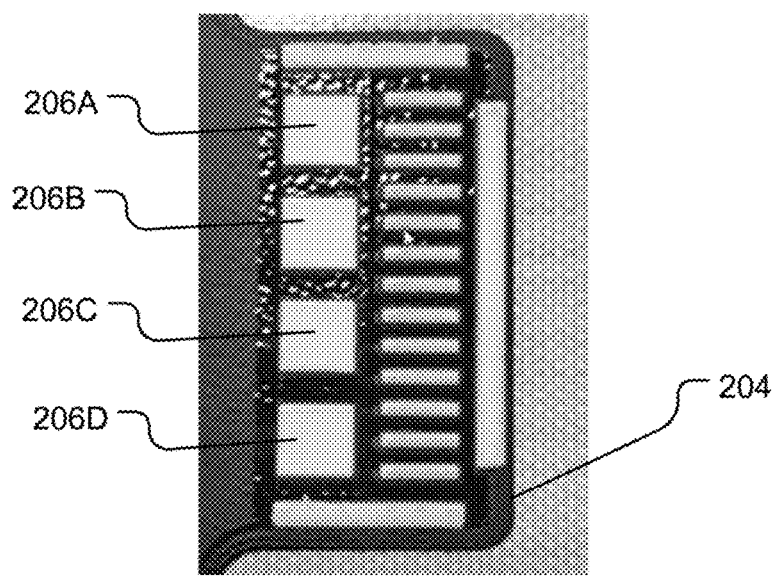
FIG. 9 is a schematic of a PCB interface 204 in accordance with disclosed embodiments.

FIG. 9 is a schematic of a PCB interface 204 in accordance with disclosed embodiments. In some embodiments, PCB interface is placed on a layer (e.g., 202, 502) to provide a connection and mounting point for a PCB (not shown) or other associated electronics. The electrically conductive portions of PCB interface 204 may be printed with silver nano-particle ink or the like. For example, FIG. 9 shows trace connector pads 206A-206D printed with silver nano-particle ink.

Figure 10:
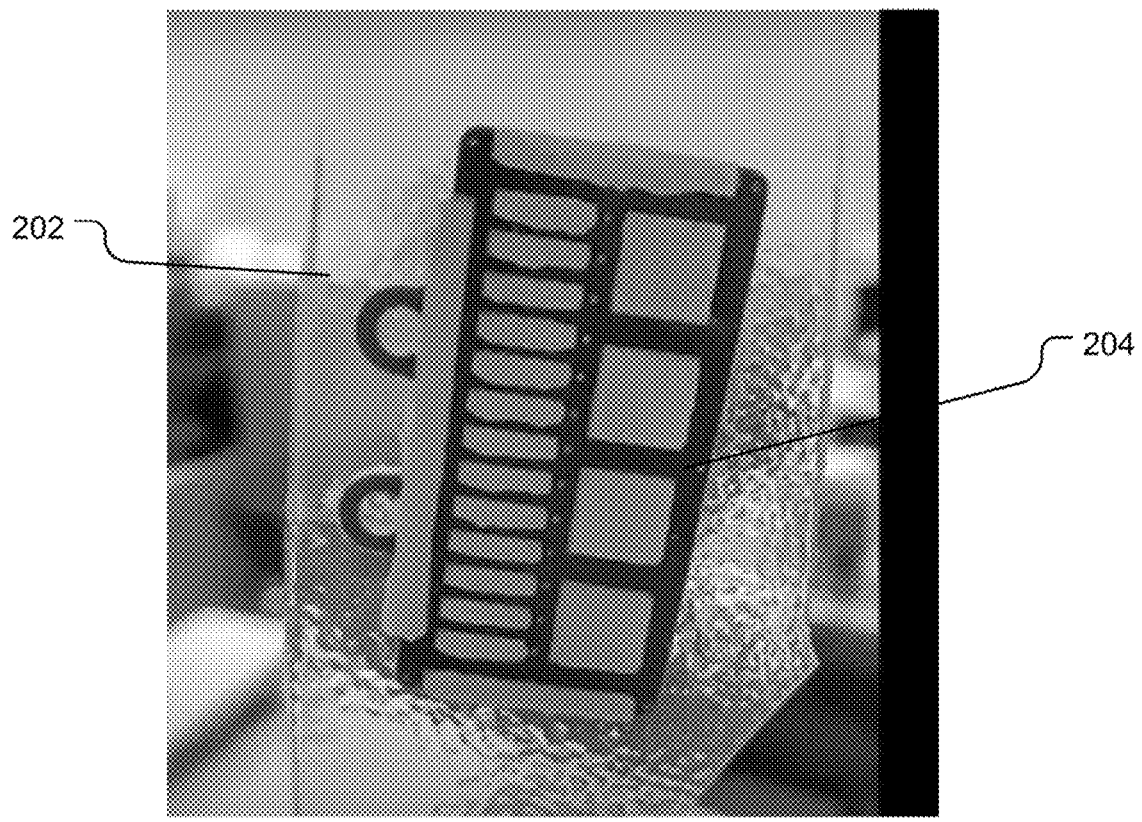
FIG. 10 is a schematic illustration of a PCB interface 204 mounted to an elastomeric layer in accordance with disclosed embodiments.

FIG. 10 is a schematic illustration of a PCB interface 204 mounted to an elastomeric layer (e.g., 202) in accordance with disclosed embodiments.

Although various embodiments have been shown and described, the present disclosure is not so limited and will be understood to include all such modifications and variations as would be apparent to one skilled in the art.

What is claimed is:

1. A compliant sensor comprising:
a signal electrode layer comprising an elastomeric material with conducting material confined to at least one sensor region, at least one trace connected to the at least one sensor region, and a perimeter electrode region;
a dielectric layer comprising an elastomeric material having a first side in contact with the signal electrode layer and configured to allow electrical contact to the perimeter electrode region; and
a top electrode layer comprising an elastomeric material with substantially continuous conducting material integrated within and confined to a location that aligns with the location of the sensor region in the signal electrode layer, and a portion of electrically conducting material configured in a hatched pattern, wherein the portion of electrically conducting material configured in a hatched pattern is in the same plane as the substantially continuous conducting material integrated within and confined to a location that aligns with the location of the sensor region in the signal electrode layer and is in a location that aligns with the at least one trace and provides electric shielding for any stray capacitance due to the at least one trace, and wherein the top electrode layer is in contact with a second side of the dielectric layer and in electrical contact with the perimeter electrode region.

2. The compliant sensor of claim 1 wherein the top electrode layer further comprises a Printed Circuit Board (PCB) interface comprising at least one conductive trace pad.

3. The compliant sensor of claim 1 wherein the conducting material comprises conductive particulate material.

4. A compliant three-electrode stack sensor comprising:
a first cover dielectric layer comprising an elastomeric material and configured to substantially cover a first side of a top electrode layer;
the top electrode layer comprising an elastomeric material with substantially continuous conductive material integrated within and confined to a location that aligns with a location of a sensor region in a signal electrode layer, and is located in the same plane as a portion of electrically conducting material configured in a hatched pattern;
a second dielectric layer comprising an elastomeric material in contact with a second side of the top electrode layer, and configured to allow electrical contact to a perimeter electrode region of the signal electrode layer;
the signal electrode layer having a first side in contact with the second dielectric layer and comprising an elastomeric material with conducting material confined to at least one sensor region, at least one trace connected to the at least one sensor region, and the perimeter electrode region;

a third dielectric layer in contact with a second side of the signal electrode layer and comprising an elastomeric material and configured to allow electrical contact to the perimeter electrode region of the signal electrode layer;

a bottom electrode layer in contact with a second side of the third dielectric layer and comprising an elastomeric material with substantially continuous conductive material integrated within and confined to a location that aligns with the location of the sensor region in the signal electrode layer, and is located in the same plane as a portion of electrically conducting material configured in a hatched pattern; and a second cover dielectric layer comprising an elastomeric material and configured to substantially cover a second side of the bottom electrode layer; and wherein the portion of electrically conducting material configured in a hatched pattern in each of the top electrode layer and the bottom electrode layer are each in a location that align with the at least one trace in the signal electrode layer and provide electric shielding for any stray capacitance due to the at least one trace.

5. The compliant three-electrode stack sensor of claim 4 wherein the top electrode layer further comprises a Printed Circuit Board (PCB) interface comprising at least one conductive trace pad.

6. The compliant three-electrode stack sensor of claim 4 wherein the conducting material comprises conductive particulate material.

7. A multi-region compliant angular displacement sensor system comprising:
a first compliant sensor further comprising:
a signal electrode layer comprising an elastomeric material with conducting material confined to at least one sensor region, at least one trace connected to the at least one sensor region, and a perimeter electrode region;
a dielectric layer comprising an elastomeric material having a first side in contact with the signal electrode layer and configured to allow electrical contact to the perimeter electrode region; and
a top electrode layer comprising an elastomeric material with substantially continuous conducting material integrated within and confined to a location that aligns with the location of the sensor region in the signal electrode layer, and a portion of electrically conducting material configured in a hatched pattern, wherein the portion of electrically conducting material configured in a hatched pattern is in the same plane as the substantially continuous conducting material integrated within and confined to a location that aligns with the location of the sensor region in the signal electrode layer and is in a location that aligns with the at least one trace and provides electric shielding for any stray capacitance due to the at least one trace, and wherein the top electrode layer is in contact with a second side of the dielectric layer and in electrical contact with the perimeter electrode region;
a second compliant sensor; and
an elastomeric connector coupling the first compliant sensor to the second compliant sensor.

8. The multi-region compliant angular displacement sensor system of claim 7 wherein the second compliant sensor further comprises:
a signal electrode layer comprising an elastomeric material with conducting material confined to at least one sensor region, at least one trace connected to the at least one sensor region, and a perimeter electrode region;
a dielectric layer comprising an elastomeric material having a first side in contact with the signal electrode layer and configured to allow electrical contact to the perimeter electrode region; and
a top electrode layer comprising an elastomeric material with conducting material integrated within and in contact with a second side of the dielectric layer and in electrical contact with the perimeter electrode region.

9. The multi-region compliant angular displacement sensor system of claim 8 wherein the top electrode layer of the second compliant sensor comprises a portion of electrically conducting material configured in a hatched pattern.

10. The multi-region compliant angular displacement sensor system of claim 7 wherein the conducting material comprises conductive particulate material.

11. The multi-region compliant angular displacement sensor system of claim 7 wherein the second compliant sensor further comprises:
a compliant three-electrode stack sensor comprising:
a first cover dielectric layer comprising an elastomeric material and configured to substantially cover a first side of a top electrode layer;
the top electrode layer comprising an elastomeric material with conductive material integrated within;
a second dielectric layer comprising an elastomeric material in contact with a second side of the top electrode layer, and configured to allow electrical contact to a perimeter electrode region of a signal electrode layer;
the signal electrode layer having a first side in contact with the second dielectric layer and comprising an elastomeric material with conducting material confined to at least one sensor region, at least one trace connected to the at least one sensor, and the perimeter electrode region;
a third dielectric layer in contact with a second side of the signal electrode layer and comprising an elastomeric material and configured to allow electrical contact to the perimeter electrode region of the signal electrode layer;
a bottom electrode layer in contact with a second side of the third dielectric layer and comprising an elastomeric material with conductive material integrated within; and
a second cover dielectric layer comprising an elastomeric material and configured to substantially cover a second side of the bottom electrode layer.

12. The multi-region compliant angular displacement sensor system of claim 11 wherein the top electrode layer of the second compliant sensor comprises a portion of electrically conducting material configured in a hatched pattern.

13. The multi-region compliant angular displacement sensor system of claim 11 wherein the bottom electrode layer of the second compliant sensor comprises a portion of electrically conducting material configured in a hatched pattern.

14. The multi-region compliant angular displacement sensor system of claim 11 wherein wherein the top electrode layer and the bottom electrode layer of the second compliant sensor comprise a portion of electrically conducting material configured in a hatched pattern.

* * * * *